Patented June 3, 1924.

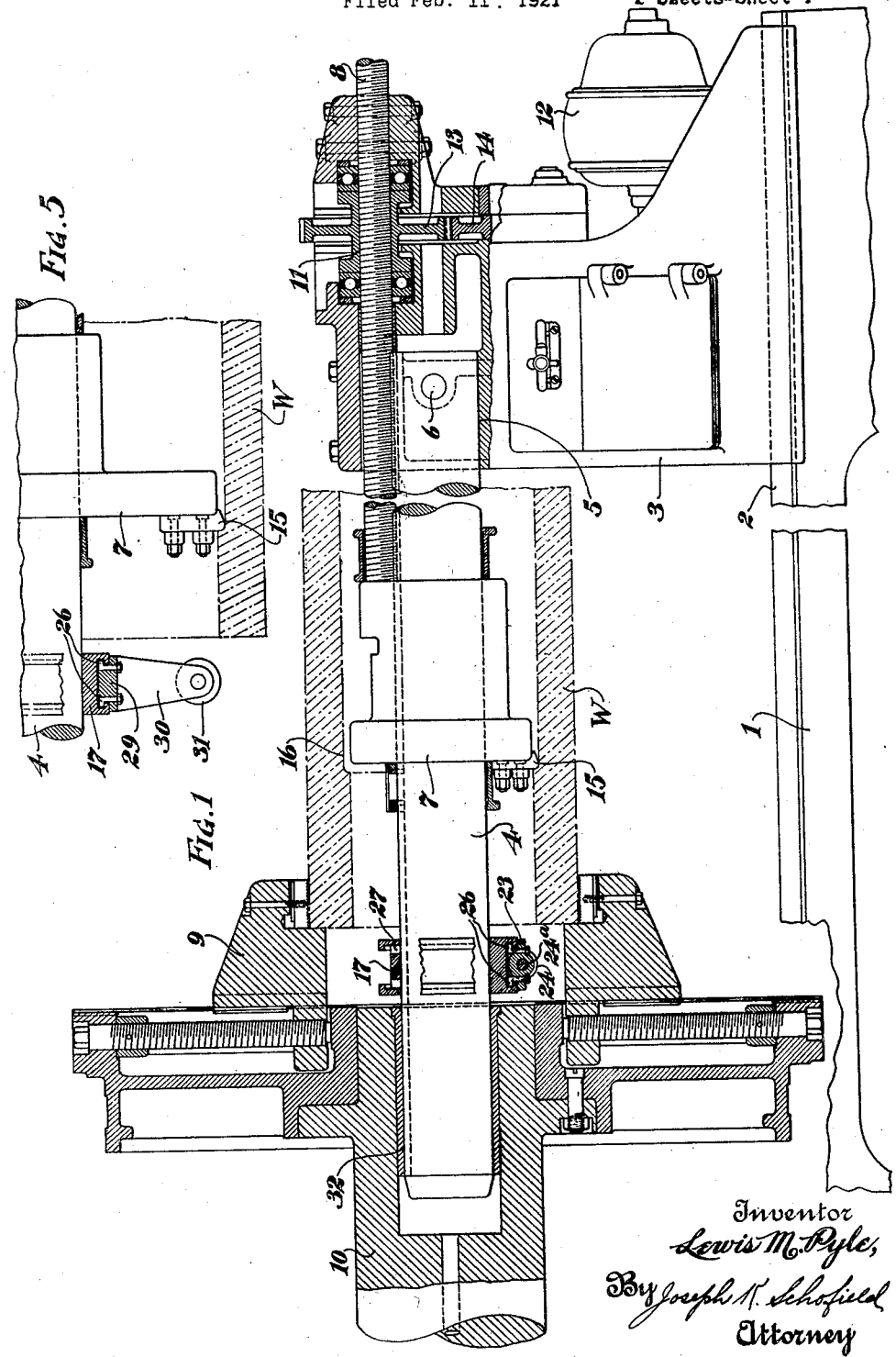

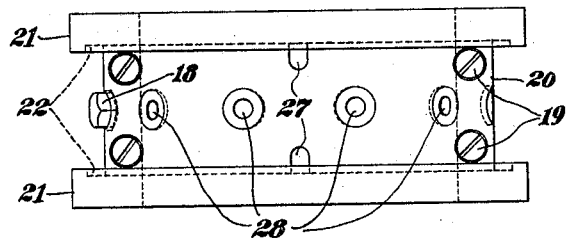
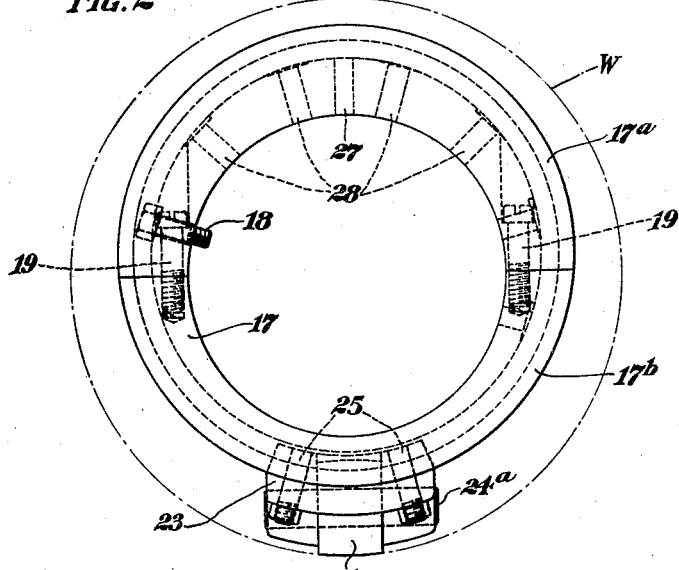
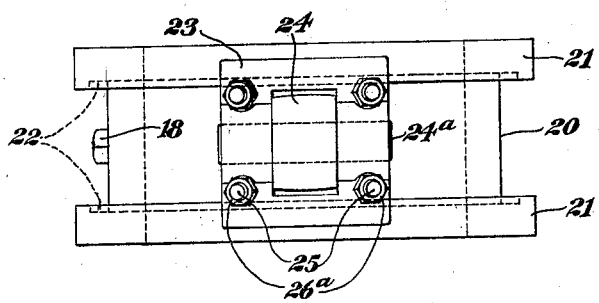

1,496,169

UNITED STATES PATENT OFFICE.

LEWIS M. PYLE, OF BRYN MAWR, PENNSYLVANIA, ASSIGNOR TO NILES-BEMENT-POND COMPANY, OF NEW YORK, N. Y., A CORPORATION OF NEW JERSEY.

ADJUSTABLE BORING-BAR SUPPORT.

Application filed February 11, 1921. Serial No. 444,152.

*To all whom it may concern:*

Be it known that I, LEWIS M. PYLE, a citizen of the United States, residing at Bryn Mawr, in the county of Montgomery and State of Pennsylvania, have invented certain new and useful Improvements in Adjustable Boring-Bar Supports, of which the following is a specification.

This invention relates to boring machines and particularly to an attachment comprising a member adapted to be mounted on a boring bar to support the same while being initially passed through the work. For boring long and heavy pieces of work, such for example as guns and gun hoops, the boring bar must necessarily be very long and heavy. When initially passing the bar through the work preparatory to boring, the same, unless supported within the work, will bend or sag considerably due to its own weight.

The present invention has for its primary object to provide means for supporting the free end of a boring bar within the bore of the work during its initial passage therethrough. Another object of the invention is to provide an adjustable support for a boring bar, such support being adapted to be adjusted radially of the bar to adapt the same to support the bar in an approximately central position within pieces of work having different sized bores therein. A further object of the invention is to provide the boring bar supporting member with anti-friction work-engaging means whereby the supporting member becomes in effect an anti-friction trolley support adapted to roll freely over the surface of the work.

With the above and other objects in view which will appear as the description proceeds, the invention will now be described by reference to the drawings wherein:

Figure 1 is a side elevation, partially broken away and partly in section, showing a boring machine illustrating the present invention as applied thereto.

Fig. 2 is an end view of the boring bar support comprising the invention.

Fig. 3 is a top plan view thereof.

Fig. 4 is a bottom plan view thereof.

Fig. 5 is a fragmentary side elevation similar to Fig. 1 but showing a modification of the invention.

A boring machine of the type illustrated in the drawings wherein the ends of the boring bar are supported in bearings with the work therebetween, the bar must necessarily be longer than the work. The bar, as illustrated, is supported at one end in the machine and the other end thereof is entered within a socket centrally of the work-rotating spindle. However, before the free end of the bar can enter such socket, the bar must be passed through the work. In boring long and heavy pieces of work, the boring bar must necessarily be very long and heavy and during this initial passage of the bar through the work, the free end thereof will sag unless supported by some means within the work. The novel means for performing this function will be hereinafter described.

1 designates the base of a boring machine on ways 2 of which is slidably mounted a boring bar supporting upright 3. 4 designates the boring bar, one end of which is rigidly mounted within the bearing 5 in the upright 3 and secured against rotation therein by means of a pin 6. A boring head 7 is mounted to slide longitudinally along the bar and is fed therealong by means of a non-rotary screw 8. A piece of work W is supported at one end in the chuck jaws 9 of a work-rotating spindle 10. A nut 11 threadedly mounted on the screw 8 within the upright 3 is adapted to be rotated from a motor 12, through gears 13 and 14 to feed the screw and boring head longitudinally along the bar. As the head is fed along, the work is rotated in contact with the tool 15 whereby the work is bored out as illustrated at 16. It should be understood that only a small portion of the length of the boring bar, the screw and the work are shown in the drawing, the same being broken away intermediate the ends as illustrated. The construction as so far specifically described does not within itself comprise any part of the present invention, which will now be described.

17 designates an annular member or ring adapted to be mounted on the boring bar as illustrated in Fig. 1 and to be secured thereto by means of a bolt 18 adapted to be threaded into the bar. The ring preferably comprises two halves 17ª and 17ᵇ secured together by means of bolts 19. The ring is provided with a central portion 20 and an annular flange 21 at each side of the central portion. As seen in Fig. 2, the flanges and the periphery of the central portion 20 are eccentric to the central boring bar receiving opening in the ring. Each flange is provided at the inner side thereof with an undercut groove 22 therein. A member as the block 23 is adapted to be mounted on the central portion 20 between the flanges 21 and to be adjusted to different positions thereon around the ring. Anti-friction means as a roller 24 is mounted on a pin 24$^a$ in the block for engaging with the inner surface of the work as illustrated in Figs. 1 and 2. Any desired means may be provided for adjustably securing the block 23 to the ring 17. I have illustrated such means as comprising a plurality of hook bolts 25 having heads 26 engaging in the grooves 22, the bolts extending through the block and provided with securing nuts 26$^a$ thereon. Holes 27 are provided in the ring for the insertion of the bolts 25 from the central opening of the ring outwardly to the position illustrated. It will be seen that with this construction, the block 23 and its work-engaging roller 24 may be adjustably secured in any position around the ring and, the ring being eccentric of the central opening, the block is moved radially thereof by such adjustment.

The supporting roller 24, in order to properly support the bar, must of course be positioned directly beneath the bar. I have therefore provided means for shifting the ring angularly of the bar to bring the roller and block in such lower position after the adjustment of the same to a different position on the periphery of the ring. This means is illustrated as comprising a plurality of radially extending holes 28 in the ring, any of said holes being adapted to receive the securing bolt 18 therein. As shown in Fig. 2, the arrangement of such holes for 180° around the ring is such as to permit the block to occupy a position beneath the bar while in any position on the ring from its innermost radial position to its outermost radial position. It should be understood that a threaded hole is provided in the boring bar for receiving the bolt 18 and that the ring may be rotated on the bar to bring any one of the holes 28 therein into alignment with such hole in the bar, the ring then being held in such position by means of the bolt 18 extending into such aligned holes.

The mechanism described above permits the supporting of a boring bar in a position approximately central of a work piece having bores of different diameters within a limited range. Should it be desired to support the bar in a work piece having a bore of a diameter beyond such range, other means comprising either another ring of a greater diameter or an attachment for the one ring must be provided. The latter alternative, being much cheaper and simpler, is preferable and the mechanism shown in Fig. 5 has been provided for this purpose. This mechanism comprises a block 29 similar to the block 23 and provided with a laterally extending portion 30 having a roller 31 thereon. A plurality of such blocks having portions 30 of different lengths may be provided if desired, any one of such blocks being adapted to be secured to the ring 17 to hold the boring bar centrally disposed within the work.

When a long piece of work is about to be bored, the work is secured in the chuck as illustrated in Fig. 1 and the trolley support, after being properly adjusted to bring the roller to the desired radial position for supporting the bar centrally within the bore, is mounted on the bar adjacent the free end thereof. The free end of the bar is then entered into the bore of the work and passed therethrough. During this initial passage of the bar through the work, the roller being underneath the bar in a manner to support the same, prevents any sagging thereof. Before the trolley rides out of the bore of the work, the free end of the bar has entered into a socket 32 centrally disposed within the work-rotating spindle and during the boring operation the trolley hangs freely on the boring bar as illustrated in Fig. 1.

What I claim is:

1. In a machine tool, the combination of a heavy horizontal boring bar, a bar supporting means mounted on the bar and including means adapted to be adjusted radially thereof and to engage the work within the bore thereof beneath the bar to support the bar therein, a head mounted on the bar and adapted to support a boring tool for operating on the work, and means for securing the first means to the bar, the said boring bar supporting means being adapted to support the bar within the work during its initial passage therethrough before the boring operation.

2. In a machine tool, the combination of a heavy horizontal boring bar, a bar supporting means mounted on the bar and including anti-friction means adapted to engage the inner surface of a piece of work to support the bar therein, means operative between the two first named means for securing the anti-friction means in different radial positions relative to the first means, a head mounted on the bar and adapted to support a boring tool for operating on the work, and screw-threaded means for securing the first means to the bar, the said boring bar supporting means being adapted to support the bar within the work during its initial passage therethrough before the boring operation.

3. A support for a boring bar comprising the combination of a member having an opening adapted to receive the bar therein, portions of the periphery of the said member being arranged at different distances from the center of the opening, bar-supporting means adapted to be mounted on the said periphery and to be adjusted to different positions therearound, and means for securing the first means to the bar.

4. A support for a boring bar comprising the combination of an annular member having an opening adapted to receive the bar therein, a portion of the periphery of the said member being arranged eccentrically of the said opening, bar-supporting means adapted to be mounted on the said periphery and to be adjusted to different positions therearound, means whereby the member may be secured on the bar in different angular positions therearound.

5. A support for a boring bar comprising the combination of means adapted to be mounted on the bar, an anti-friction roller mounted on the first named means and adapted to engage the inner surface of a piece of work to support the bar while being passed longitudinally therethrough, the axis of the roller in operation being transverse to the axis of the bar, and means operative between the first named means and the roller for securing the roller in different radial positions relative to the first means.

6. A support for a boring bar comprising the combination of an annular member having an opening adapted to receive the bar therein, portions of the periphery of the said member being arranged at different distances from the center of the opening, bar-supporting means adapted to be mounted on the said periphery and to be adjusted to different positions therearound, work-engaging anti-friction means mounted on the bar-supporting means and adapted to engage the inner surface of the work to support the bar therein, and means for securing the first means to the bar.

7. A support for a boring bar comprising the combination of an annular member having an opening adapted to receive the bar therein, portions of the periphery of the said member being arranged at different distances from the center of the opening and a portion of such periphery being provided with a plurality of radially extending holes therein adapted to receive a bolt for securing the member on the bar in different angular positions, bar-supporting means adapted to be mounted on the said periphery and to be adjusted to different positions therearound, and means for securing the first means to the bar.

8. A support for a boring bar comprising the combination of an annular member having an opening adapted to receive the bar therein, portions of the periphery of the said member being arranged at different distances from the center of the opening, a block having work-engaging means thereon for supporting the bar in the work, means for securing the block in different positions around the periphery of the said member, and means for securing the first means to the bar.

9. A support for a boring bar comprising the combination of an annular member having an opening adapted to receive the bar therein, portions of the periphery of the said member being arranged at different distances from the center of the opening, a block having work-engaging means thereon for supporting the bar in the work, the periphery of the annular member being provided with flanges having undercut grooves therein, and hook bolts adapted to engage in the grooves to secure the block in different positions around the periphery of the said member.

10. A support for a boring bar comprising the combination of an annular member having an opening adapted to receive a boring bar therein, a portion of the periphery of the said member being arranged eccentrically of the said opening and being provided with a pair of circumferentially extending flanges thereon, the said flanges each being provided with an undercut groove therein, and means secured to the block and adapted to engage within the said grooves to secure the block to the said member in different positions around the eccentric periphery thereof.

In testimony whereof, I hereto affix my signature.

LEWIS M. PYLE.